Patented Aug. 13, 1940

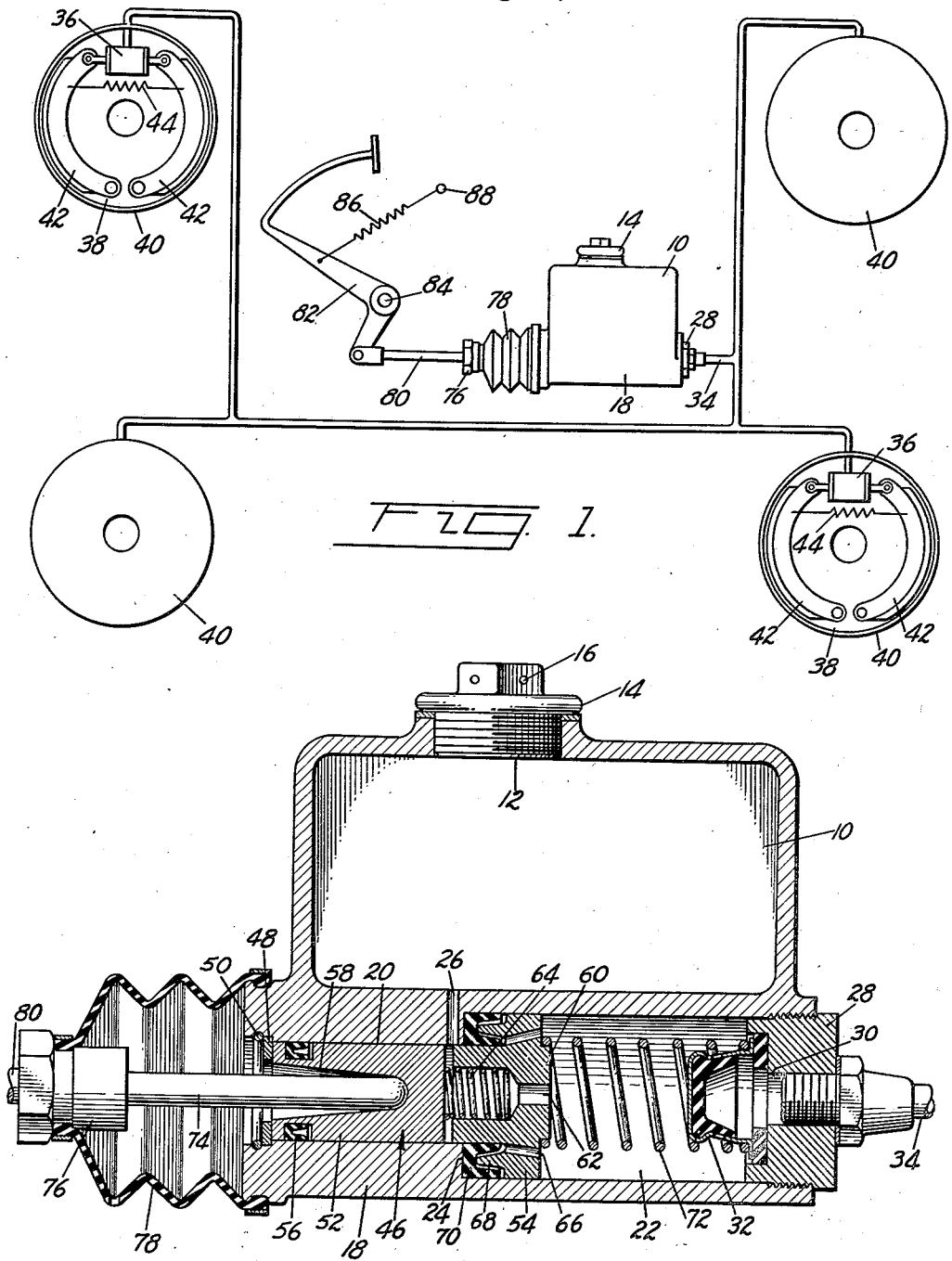

2,211,652

UNITED STATES PATENT OFFICE 2,211,652

FLUID PRESSURE PRODUCING DEVICE

Clarence V. Gardner, Detroit, Mich., assignor to Hydraulic Brake Company, Detroit, Mich., a corporation of California Application August 19, 1937, Serial No. 159,812

5 Claims. (Cl. 60—54.6)

This invention relates to fluid pressure braking systems, and more particularly to fluid pressure producing devices.

Fluid pressure producing devices, including a reservoir, a cylinder communicating therewith, and a piston reciprocable in the cylinder, are generally provided with a supply port and a compensating port providing communication between the cylinder and the reservoir.

In fluid pressure producing devices of this type the compensating port is located slightly in advance of a sealing cup on the head of the piston, hence, upon each actuation of the piston, the cup moves over the compensating port, and, due to pressure on the fluid in the cylinder, the lip of the cup is squeezed or forced into the port, resulting in cutting a groove in the lip thereof and thus rendering the cup more or less ineffective for sealing purposes. The present invention aims to overcome this difficulty by eliminating the compensating port.

An object of the invention is to provide a reservoir, a cylinder supplied therefrom, and a piston reciprocable in the cylinder having a body and a detached apertured head movable relative to the body operative to establish communication between the reservoir and the cylinder when the piston is in fully retracted position.

Other objects and advantages of the invention will appear from the following description taken in connection with the drawing forming a part of this specification, and in which, Fig. 1 is a schematic view of a fluid pressure braking system embodying the invention; and Fig. 2 is a sectional view of the fluid pressure producing device connected in the system.

Referring to the drawing for more specific details of the invention, 10 represents a reservoir having a filling opening 12 normally closed as by a plug 14 provided with openings 16 for venting the reservoir to the atmosphere. A cylinder 18 at the base of the reservoir includes a small chamber 20, and a large chamber 22 arranged concentrically to and forward of the small chamber providing at its junction with the small chamber an annular shoulder 24. The small chamber 20 has a port 26 providing a communication between the small chamber and the reservoir, and the large chamber 22 has a head 28 provided with a discharge port 30 controlled as by a two-way valve 32.

A fluid pressure delivery pipe or conduit 34 connected to the discharge port 30 has branches connected respectively to fluid pressure actuated motors 36 for the actuation of brakes of any desirable type. The brakes are preferably arranged in pairs, one pair associated with the front wheels of a vehicle and another associated with the rear wheels of the vehicle.

As shown, each of the brakes includes a fixed support or backing plate 38, a rotatable drum 40 associated therewith, a pair of corresponding interchangeable friction elements or shoes 42 pivoted on the backing plate, and a fluid pressure actuated motor corresponding to the motor 36 mounted on the backing plate between the shoes and operative to actuate the shoes into engagement with the drum against the resistance of a retractile spring 44 connecting the shoes.

A piston 46 reciprocable in the cylinder 18 is held against displacement by a washer 48 seated on a retaining ring 50 fitted in a circumferential groove in the wall of the cylinder adjacent the open end of the small chamber 20. The piston includes a body 52 and a detached double diametral head 54. The body 52 has a diameter complementary to the bore of the chamber 20. The body carries a sealing cup 56 for preventing seepage of fluid from the cylinder past the piston, and in the back of the body is a recess 58, the purpose of which will hereinafter appear.

The head 54 has a part of the same diameter as that of the body 52, arranged in axial alignment with the body and adapted to be engaged thereby, and another part complementary to the bore of the chamber 22 having a short concentric extension 60. The head also has an axial bore 62 providing a passage for the flow of fluid through the head. This bore 62 has a double diameter, and fitted in that portion of the bore having the larger diameter is a spring 64 having its respective ends seated on the body 52 of the piston and on an annular shoulder at the junction of the large and small diametral sections of the bore. That portion of the head having the larger diameter has a plurality of passages 66 extending therethrough, and arranged on the back thereof is an annular flange 68.

An annular double-lipped sealing cup 70 seated on the annular shoulder 24 at the junction of the chambers 20 and 22 embraces the wall of the chamber 22 and the piston so as to provide an effective seal. This cup also receives the flange 68 between its marginal lips and cushions the head 54 when the piston is in fully retracted position.

A spring 72 interposed between the head 54 and the valve 32 has one of its ends sleeved on the extension 60 and its other end sleeved on the valve 32. This spring serves to return the piston to its retracted position and also serves to retain the valve against displacement.

The recess 58 in the back of the piston receives one end of a thrust pin 74, the other end of which has secured thereto a coupling 76 connected as by a flexible boot 78 to the open end of the small chamber 20 of the cylinder 18 for the exclusion of dust and other foreign substances, and a rod 80 connects the coupling to a foot pedal lever 82 mounted on a stub shaft 84 and connected as by a retractile spring 86 to a fixed support 88.

In operation, upon depressing the foot pedal lever 82, force is transmitted from the lever to the piston 46, resulting in moving the position on its compression stroke. During the initial movement of the piston on its compression stroke, the body 52 advances under the resistance of the spring 64 and engages the detached head 54, thereafter the body 52 and the detached head 54 move as a single unit. As the piston advances on its compression stroke, it slides freely through the sealing cup 70, and the pressure on the fluid in the chamber 22 serves to retain the cup against displacement. During this movement of the piston fluid is displaced from the large chamber 22 past the two-way valve 32, inhibiting retrograde movement of the fluid, and through the discharge port 30 and the fluid pressure delivery pipe 34 and its respective branches into the fluid pressure actuated motor 36, causing actuation of the motor with the resultant spreading of the shoes 42 into engagement with the drum against the resistance of the retractile springs 44.

Upon release of the foot pedal lever 82, the lever is returned to its normal or retracted position under the influence of the retractile spring 86. As the foot pedal lever returns to its retracted position, the thrust pin 74 connected to the foot pedal lever by the coupling 76 and the rod 80 is likewise retracted. This results in release of the piston 46, whereupon the spring 72 becomes effective to return the piston to its retracted position. When the piston returns to its retracted position, the detached head 54 seats on the sealing cup 70 and the spring 64 moves the body 52 of the piston to its seat on the washer 58 so as to space the body and head apart. This results in establishing communication between that portion of the cylinder forward of the piston and the reservoir by way of the passage 62 in the head of the piston, the space between the body and the head of the piston, and the port 26.

During this operation fluid is returning to the cylinder from the fluid pressure actuated motors 36 and the fluid pressure delivery pipes connecting the motors to the cylinder under the influence of the retractile springs 44 connecting the shoes 42 of the respective brakes. Should there be an excess of fluid over and above the quantity required to completely fill the cylinder, caused by expansion due to heat, such surplus may be returned to the reservoir since the reservoir and cylinder are in communication when the piston is in fully retracted position.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is,

1. A fluid pressure producing device including a cylinder, a piston reciprocable therein including a body and a detached orificed head, means yieldingly retaining the head and body in spaced relation, a sealing cup embracing the wall of the cylinder and the piston, and a shoulder in said cylinder, said cup engaging said shoulder and providing a cushion for the head when the latter is in retracted position.

2. A fluid pressure producing device comprising a cylinder having a small chamber and a large chamber, a piston reciprocable in the cylinder including a body complementary to the bore of the small chamber and a detached head having a part complementary to the bore of the small chamber and another part complementary to the bore of the large chamber, said head having a double diametral bore therethrough, a spring in the bore seated on the body, and a sealing cup embracing the wall of the cylinder and the piston.

3. A fluid pressure producing device comprising a cylinder having a small chamber and a large chamber arranged concentric to one another and providing an annular shoulder at their junction, a piston reciprocable in the cylinder including a body complementary to the bore of the small chamber and a detached head having a part complementary to the bore of the small chamber and another part complementary to the bore of the large chamber, said head having a double diametral axial bore, a spring in the bore seated on the body, and a sealing cup on the annular shoulder embracing the wall of the cylinder and the piston and providing a cushion for the head.

4. A fluid pressure producing device comprising a cylinder having a small chamber and a large chamber arranged concentrically to and forward of the small chamber and providing an annular shoulder at the junction of the chambers, a piston reciprocable in the cylinder including a body complementary to the bore of the small chamber and a detached head having a part complementary to the bore of the small chamber and another part complementary to the bore of the large chamber, said head having a double diametral axial bore and a plurality of passages arranged in spaced relation, a flange on the back of that portion of the head having a diameter complementary to the bore of the large chamber, a spring in the axial bore seated on the body, and a double-lipped sealing cup on the annular shoulder at the junction of the chambers embracing the wall of the cylinder and the piston.

5. A fluid pressure producing device comprising a cylinder having a small chamber and a large chamber arranged concentrically to and forward of the small chamber and providing an annular shoulder at the junction of the chambers, a piston reciprocable in the cylinder including a body complementary to the bore of the small chamber and a detached head having a part complementary to the bore of the small chamber and another part complementary to the bore of the large chamber, an annular flange on the back of that part of the head having the larger diameter, said head having a double diametral bore and a plurality of spaced passages therethrough, a spring in the large bore of the head engaging the body of the piston, an annular sealing cup on the shoulder at the junction of the chambers embracing the wall of the large chamber and the piston and receiving the flange on the head when the piston is in fully retracted position, means for advancing the piston, and means for retracting the piston.

CLARENCE V. GARDNER.